United States Patent
Bansal et al.

(10) Patent No.: US 10,976,959 B2
(45) Date of Patent: Apr. 13, 2021

(54) METHOD AND SYSTEM FOR ACCESSING VIRTUAL MACHINE STATE WHILE VIRTUAL MACHINE RESTORATION IS UNDERWAY

(71) Applicant: EMC IP Holding Company LLC, Hopkinton, MA (US)

(72) Inventors: Aaditya Bansal, Bangalore (IN); Shelesh Chopra, Bangalore (IN); Soumen Acharya, Bangalore (IN); Sunil Yadav, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 248 days.

(21) Appl. No.: 16/041,975

(22) Filed: Jul. 23, 2018

(65) Prior Publication Data

US 2020/0026463 A1    Jan. 23, 2020

(51) Int. Cl.
*G06F 3/06* (2006.01)
*G06F 12/00* (2006.01)
*G06F 13/00* (2006.01)
*G06F 12/0868* (2016.01)
*G06F 9/455* (2018.01)

(52) U.S. Cl.
CPC .......... *G06F 3/0659* (2013.01); *G06F 3/0604* (2013.01); *G06F 3/064* (2013.01); *G06F 3/0643* (2013.01); *G06F 3/0664* (2013.01); *G06F 12/0868* (2013.01); *G06F 9/45558* (2013.01); *G06F 2212/1021* (2013.01)

(58) Field of Classification Search
CPC ................ G06F 3/06; G06F 3/0659

USPC ........................................................ 711/118
See application file for complete search history.

(56) References Cited

U.S. PATENT DOCUMENTS

| | | | | |
|---|---|---|---|---|
| 8,635,057 B2* | 1/2014 | Ganguly | ............. | G06F 9/45558 703/27 |
| 8,819,674 B2* | 8/2014 | Parikh | ................. | G06F 9/45537 718/1 |
| 9,037,547 B1* | 5/2015 | Shivdeo | .............. | G06F 11/1453 707/664 |
| 9,244,969 B1* | 1/2016 | Love | ..................... | G06F 16/182 |
| 10,067,838 B1* | 9/2018 | Keeriyadath | ....... | G06F 11/2035 |
| 10,552,610 B1* | 2/2020 | Vashisht | ............... | G06F 3/0623 |
| 10,565,183 B1* | 2/2020 | Colgrove | .............. | G06F 3/0665 |
| 2008/0178290 A1* | 7/2008 | Besch | ................... | G06F 21/566 726/22 |

(Continued)

OTHER PUBLICATIONS

"Virtual Hard Disk Image Format Specification", Microsoft Windows, Microsoft Corporation, Version 1.0, Oct. 11, 2006 (17 pages).

*Primary Examiner* — Mohamed M Gebril
(74) *Attorney, Agent, or Firm* — Chamberlain, Hrdlicka, White, Williams & Aughtry

(57) ABSTRACT

An optimized solution for accessing virtual machine state while restoration of a respective virtual machine is underway. Specifically, the optimized solution disclosed herein implements a fetching mechanism for retrieving granular virtual machine state over a network and/or from a remote storage system. The fetching mechanism leverages block allocation information in parallel with disk caching to provide instant (or near instant) access to a virtual machine state while also, concurrently, restoring the respective virtual machine.

18 Claims, 14 Drawing Sheets

(56) References Cited

U.S. PATENT DOCUMENTS

| | | | |
|---|---|---|---|
| 2010/0049750 A1* | 2/2010 | Srivastava | G06F 11/1469 707/E17.005 |
| 2013/0036418 A1* | 2/2013 | Yadappanavar | G06F 3/0611 718/1 |
| 2013/0117744 A1* | 5/2013 | Klein | G06F 9/45533 718/1 |
| 2013/0159363 A1* | 6/2013 | Katayama | G06F 16/172 707/824 |
| 2014/0324793 A1* | 10/2014 | Glazemakers | G06F 9/45558 707/692 |
| 2016/0070623 A1* | 3/2016 | Derk | G06F 11/1469 714/6.23 |
| 2016/0085636 A1* | 3/2016 | Dornemann | G06F 11/1448 707/679 |
| 2018/0136957 A1* | 5/2018 | Guo | G06F 9/45558 |
| 2019/0056890 A1* | 2/2019 | Wookey | G06F 3/0604 |

\* cited by examiner

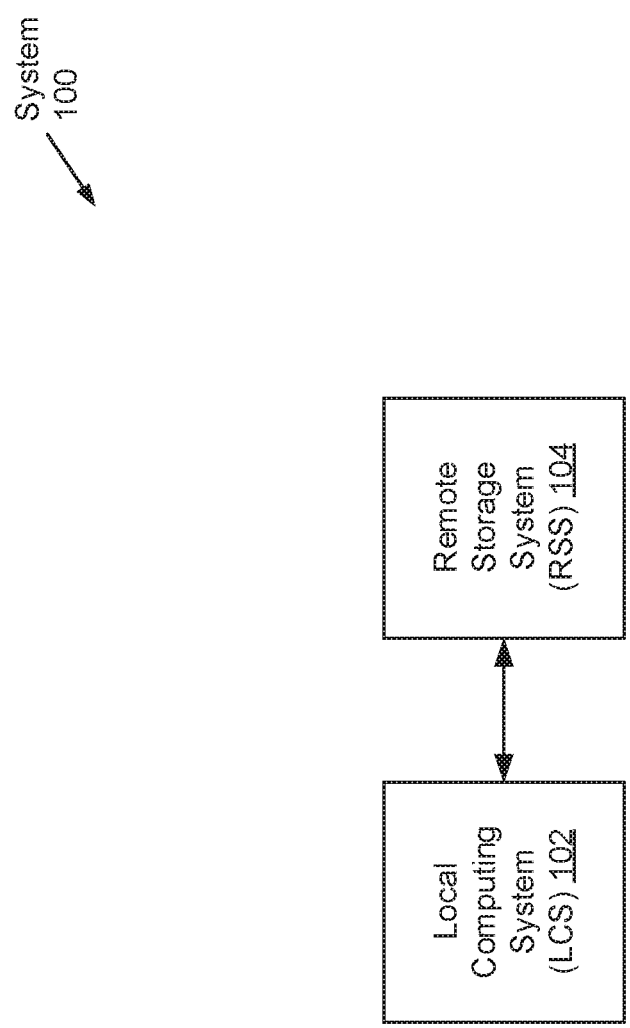

METHOD AND SYSTEM FOR ACCESSING VIRTUAL MACHINE STATE WHILE VIRTUAL MACHINE RESTORATION IS UNDERWAY

BACKGROUND

Granular virtual machine recovery enables the restoration of particular virtual machine state rather than requiring restoration of the virtual machine state in entirety. However, current methodologies for implementing granular virtual machine recovery tend to be slow and time consuming.

BRIEF DESCRIPTION OF DRAWINGS

FIG. 1A shows a system in accordance with one or more embodiments of the invention.

DETAILED DESCRIPTION

Figure 1B:
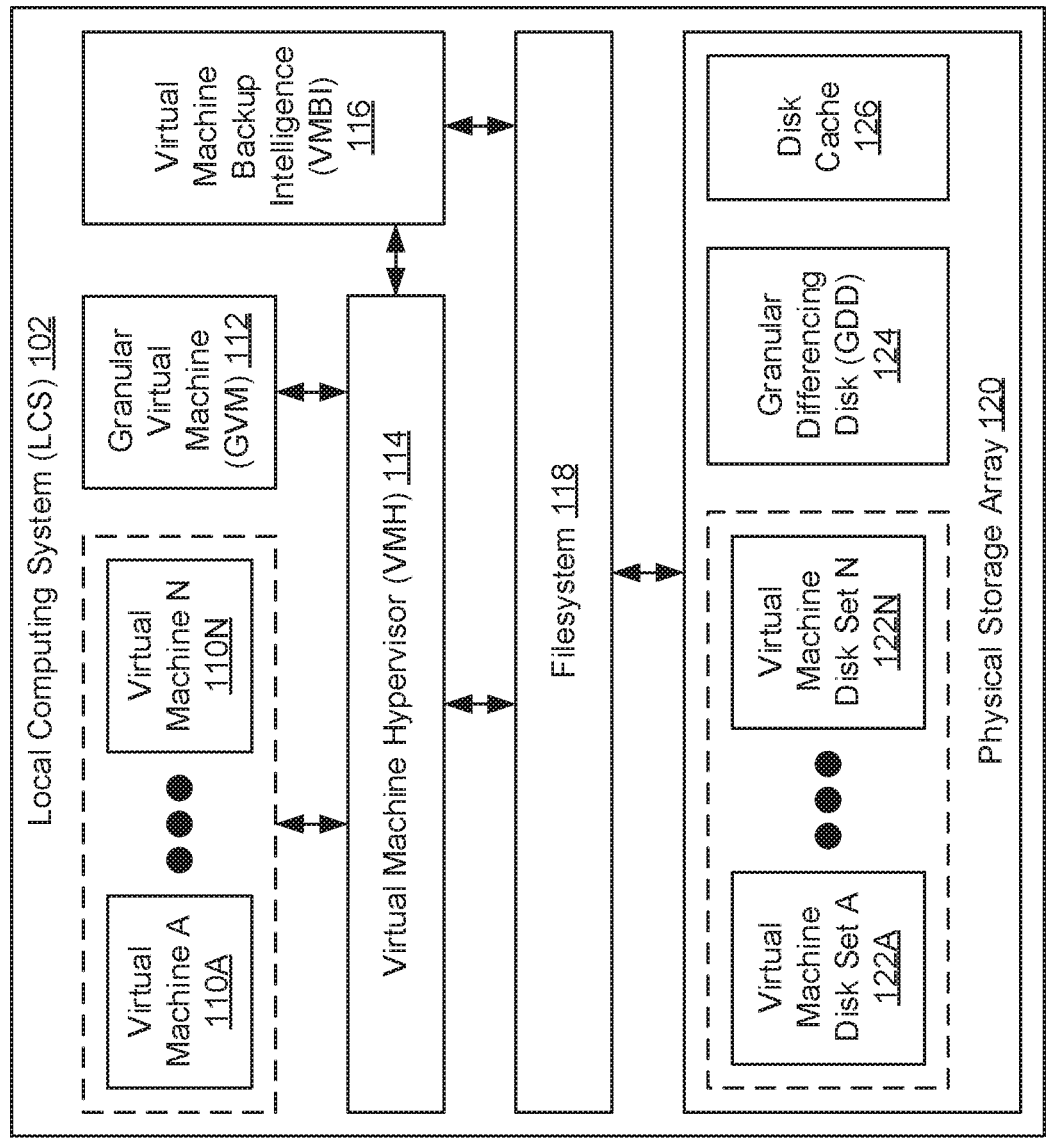
FIG. 1B shows a local computing system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to an optimized solution for accessing virtual machine state while restoration of a respective virtual machine is underway. Specifically, one or more embodiments of the invention implement a fetching mechanism for retrieving granular virtual machine state over a network and/or from a remote storage system. The fetching mechanism leverages block allocation information in parallel with disk caching to provide instant (or near instant) access to a virtual machine state while also, concurrently, restoring the respective virtual machine.

FIG. 1A shows a system in accordance with one or more embodiments of the invention. The system (100) may include a local computing system (LCS) (102) operatively connected to a remote storage system (RSS) (104). Each of these components is described below.

In one embodiment of the invention, the aforementioned components may be directly or indirectly connected to one another through a network (e.g., a local area network (LAN), a wide area network (WAN) such as the Internet, a mobile network, or any other network) (not shown). The network may be implemented using any combination of wired and/or wireless connections. In embodiments in which the aforementioned components are indirectly connected, there may be other networking components or systems (e.g., switches, routers, gateways, etc.) that facilitate communication, information exchange, and/or resource sharing. Further, the aforementioned components may communicate with one another using any combination of wired and/or wireless communication protocols.

In one embodiment of the invention, the LCS (102) may be any computing system (see e.g., FIG. 4) used for various applications. These applications may, for example, require large-scale and complex data processing. In one embodiment of the invention, the LCS (102) may be any computing system that may serve multiple users concurrently. Further, the LCS (102) may be programmed to provide and manage the allocation of computing resources (e.g., computer processors, memory, persistent and non-persistent storage, network bandwidth, etc.) towards the execution of various processes (or tasks) that may be instantiated thereon. Examples of the LCS (102) include, but are not limited to, one or more: desktop computers, laptop computers, smartphones, tablet computers, gaming consoles, servers, mainframes, or any combination thereof. The LCS (102) is described in further detail below with respect to FIG. 1B.

In one embodiment of the invention, the RSS (104) may refer to a data backup, archiving, and/or disaster recovery storage system. The RSS (104) may be implemented using one or more servers (not shown). Each server may be a physical server (i.e., which may reside in a datacenter) or a virtual server (i.e., which may reside in a cloud computing environment). In one embodiment of the invention, the RSS (104) may be implemented on one or more computing systems similar to the exemplary computing system shown in FIG. 4. The RSS (104) is described in further detail below with respect to FIG. 1C.

While FIG. 1A shows a configuration of components, other system configurations may be used without departing from the scope of the invention.

FIG. 1B shows a local computing system (LCS) in accordance with one or more embodiments of the invention. The LCS (102) may include one or more virtual machines (110A-110N), a granular virtual machine (GVM) (112), a virtual machine hypervisor (VMH) (114), a virtual machine backup intelligence (VMBI) (116), a filesystem (118), and a physical storage array (120). Each of these components is described below.

In one embodiment of the invention, each virtual machine (110A-110N) may be a computer program that executes on the underlying hardware of the LCS (102). Further, each virtual machine (110A-110N) may represent a computer program that emulates a physical computing system and, thus, provides a self-contained execution environment on which one or more other computer programs (e.g., guest operating systems (OSs) and/or applications) may execute. In addition, each virtual machine (110A-110N) may access the underlying LCS (102) hardware and interact with other LCS (102) components using an abstraction layer—i.e., the VMH (114) (described below). Moreover, each virtual machine (110A-110N) may include functionality to submit disk input-output (IO) operations directed to reading data from and writing data to a corresponding virtual machine disk set (122A-122N) residing on the physical storage array (120).

In one embodiment of the invention, the GVM (112) may be a specialized virtual machine, or computer program, that executes on the underlying hardware of the LCS (102). Particularly, the GVM (112) may serve as a portal or interface, which when interacted with by a user, enables the user to instantly access granular virtual machine state pertaining to a given virtual machine (110A-110N) while the virtual machine (110A-110N) is undergoing restoration. To that end, the GVM (112) may include functionality to: submit read requests, based on user interaction, to instantly access (i.e., retrieve) data consolidated on the remote storage system (RSS) (see e.g., FIG. 1C). The mechanism that enables this functionality may be facilitated by the VMBI (116) in conjunction with the filesystem (118) and disk cache (126), which is described in further detail below with respect to FIGS. 3A-3D.

In one embodiment of the invention, the VMH (114) may be a computer program or process (i.e., an instance of a computer program) that executes on the underlying hardware of the LCS (102). Specifically, the VMH (114) may be a computer program or process tasked with the management of one or more virtual machines (110A-110N) and the GVM (112). To that extent, the VMH (114) may include functionality to: create and delete virtual machines (110A-110N); allocate or deallocate LCS (102) resources to support the execution of the virtual machines (110A-110N) and the GVM (112); and enable, as well as manage, intra-host communication between the virtual machines (110A-110N), the GVM (112), and other LCS (102) components (e.g., the VMBI (116), the filesystem (118), and the physical storage array (120)). One of ordinary skill will appreciate that the VMH (114) may perform other functionalities without departing from the scope of the invention.

In one embodiment of the invention, the VMBI (116) may a computer program or process (i.e., an instance of a computer program) that executes on the underlying hardware of the LCS (102). Specifically, the VMBI (116) may be a computer program or process tasked with, at least in part, managing virtual machine backup and recovery operations. To that extent, the VMBI (116) may include functionality to: generate virtual machine backups (e.g., full backups or incremental backups) for any given virtual machine (110A-110N), where virtual machine backup generation may entail replication of virtual machine state and/or metadata representative of a corresponding virtual machine disk set (122A-122N); transmit the generated virtual machine backups to the RSS for remote consolidation; after a failure event, retrieve consolidated virtual machine backups from the RSS; and restore any given virtual machine (110A-110N) using the retrieved virtual machine backup information. Further, in one embodiment of the invention, the VMBI (116) may include further functionality to facilitate the instant access of virtual machine state during virtual machine restoration in accordance with embodiments of the invention (see e.g., FIGS. 3A-3D). One of ordinary skill will appreciate that the VMBI (116) may perform other functionalities without departing from the scope of the invention.

In one embodiment of the invention, the filesystem (118) may represent one or more data objects or structures that collectively index and track the various forms of information consolidated in the physical storage array (120). The filesystem (118) may index and track the aforementioned information through at least a directory and an inode table (see e.g., FIG. 2C), which may map filenames to disk sectors in the physical storage array (120) on which the information corresponding to the filenames may reside. In one embodiment of the invention, other components of the LCS (102) (e.g., the VMH (114) and the VMBI (116)) may interact with the filesystem (118) through a filesystem driver (not shown). The filesystem driver may represent a computer program that facilitates operation and/or control of the filesystem (118). Further, the filesystem (118) may include one or more filesystem filter drivers (not shown) over the filesystem driver. A filesystem filter driver may refer to an additional computer program that may modify the behavior of the filesystem (118). To that extent, a filesystem filter driver may intercept input-output (IO) operations (i.e., read and write requests) intended for the filesystem (118) and, subsequently, extend or replace functionality provided by the filesystem (118).

In one embodiment of the invention, the physical storage array (120) may represent a collection of one or more physical storage devices and/or media on which various forms of information—pertinent to the LCS (102)—may be consolidated. The one or more physical storage devices and/or media may or may not be of the same type. Further, the information consolidated in the physical storage array (120) may be arranged by way of the filesystem (118) (described above). In one embodiment of the invention, the physical storage array (120) may be implemented using persistent (i.e., non-volatile) storage. Examples of persistent storage include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the physical storage array (120) may store one or more virtual machine disk sets (122A-122N). Each virtual machine disk set (122A-122N) may represent a collection of one or more virtual machine disks (not shown), which retain snapshots of state pertaining to a corresponding virtual machine (110A-110N) at various recovery points-in-time. That is, the cardinality of virtual machine disk sets (122A-122N) matches the cardinality of virtual machines (110A-110N), thus ensuring a one-to-one mapping between virtual machine disk sets (122A-122N) and virtual machines (110A-110N). Further, each virtual machine disk (not shown) of a virtual machine disk set (122A-122N) may be a logical container, a data object, or a data structure that stores virtual machine state and associated metadata. Moreover, each virtual machine disk (not shown) may span across one or more physical storage devices and/or media that implement, at least in part, the physical storage array (120).

In one embodiment of the invention, the physical storage array (120) may store a granular differencing disk (GDD) (124). The GDD (124) may represent a virtual machine disk (see e.g., FIG. 2B) that serves as a local mount point for virtual machine state otherwise consolidated on a remote platform (e.g., the RSS). That is, the GDD (124) may represent an entry point to an external storage partition. To that extent, the GDD (124) may be supported by a symbolic link (i.e., symlink) between the LCS (102) and the external storage partition (e.g., a virtual machine disk of a replica virtual machine disk set (see e.g., FIG. 1C)). A symbolic link (not shown) may refer to a first filesystem object (e.g., a directory) that references (or points to) a second filesystem object (e.g., another directory), which thus enables the information stored under the second filesystem object to become accessible through the first filesystem object. In view of the above, the GVM (112) may interact with the GDD (124) to enable a user to instantly access (or browse) granular portions of any given virtual machine disk on the RSS. Moreover, in one embodiment of the invention, the GDD (124) may represent a replica virtual machine disk being restored on the LCS (102).

In one embodiment of the invention, the physical storage array (120) may store disk cache (126). The disk cache (126) may refer to a buffer or, alternatively, a logical partition of the physical storage array (120), where the most recent and/or most frequently accessed data may be stored, albeit temporarily. That is, the disk cache (126) may serve as a local repository for storing information recently retrieved from a remote platform (e.g., the RSS). Further, when the same information needs to be accessed again, the disk cache (126) provides faster access to the information, therefore bypassing the need to re-retrieve the same information from the remote platform, which could result in a much slower read operation. The disk cache (126) is described in further detail below with respect to FIG. 2D.

Figure 1C:
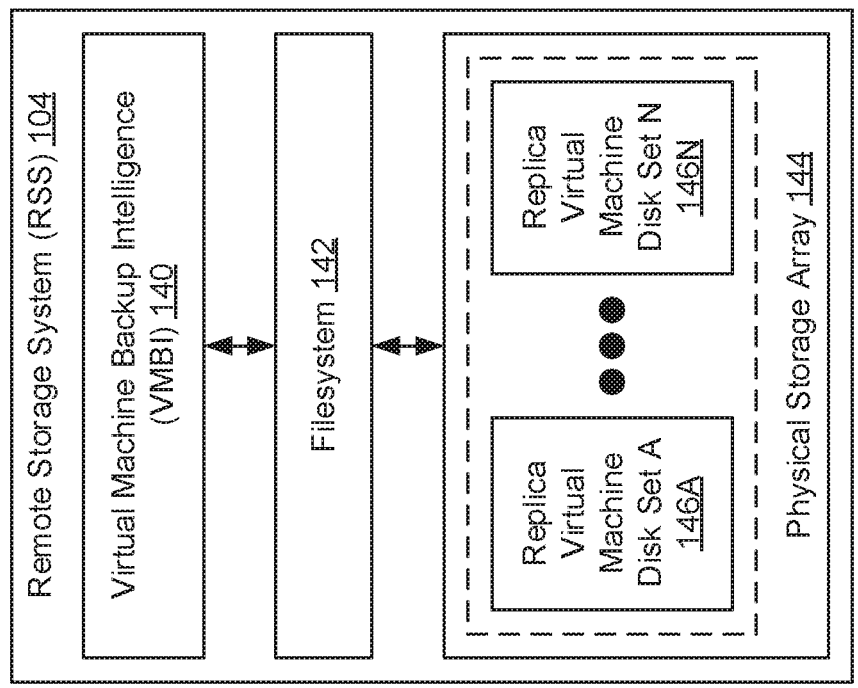
FIG. 1C shows a remote storage system in accordance with one or more embodiments of the invention.

FIG. 1C shows a remote storage system (RSS) in accordance with one or more embodiments of the invention. The RSS (104) may include a virtual machine backup intelligence (VMBI) (140) (i.e., a counterpart to the VMBI residing on the local computing system (LCS) (see e.g., FIG. 1B)), a filesystem (142), and a physical storage array (144). Each of these components is described below.

In one embodiment of the invention, the VMBI (140) may be a computer program or process (i.e., an instance of a computer program) that executes on the underlying hardware of the RSS (104). Specifically, the VMBI (140) may be a computer program or process tasked with, at least in part, managing virtual machine backup and recovery operations. To that extent, the VMBI (140) may include functionality to: receive virtual machine backups (e.g., full backups or incremental backups) for any given virtual machine (not shown) from the LCS; consolidate the received virtual machine backups in an appropriate replica virtual machine disk set (146A-146N); receive requests directed to the restoration of virtual machines; and, in response to the received requests, identify the appropriate virtual machine state (from the physical storage array (144)) and provide the virtual machine state to the LCS. One of ordinary skill will appreciate that the VMBI (130) may perform other functionalities without departing from the scope of the invention.

In one embodiment of the invention, the filesystem (142) may represent one or more data objects or structures that collectively index and track the various forms of information consolidated in the physical storage array (144). The filesystem (142) may index and track the aforementioned information through at least a directory and an inode table (see e.g., FIG. 2C), which may map filenames to disk sectors in the physical storage array (144) on which the information corresponding to the filenames may reside. In one embodiment of the invention, other components of the RSS (104) (e.g., the VMBI (140)), as well as external entities (e.g., the LCS), may interact with the filesystem (142) through a filesystem driver (not shown). The filesystem driver may represent a computer program that facilitates operation and/or control of the filesystem (142). Further, the filesystem (142) may include one or more filesystem filter drivers (not shown) over the filesystem driver. A filesystem filter driver may refer to an additional computer program that may modify the behavior of the filesystem (142). To that extent, a filesystem filter driver may intercept input-output (IO) operations (i.e., read and write requests) intended for the filesystem (142) and, subsequently, extend or replace functionality provided by the filesystem (142).

In one embodiment of the invention, the physical storage array (144) may represent a collection of one or more physical storage devices and/or media on which various forms of replicated information—pertinent to the LCS—may be consolidated. The one or more physical storage devices and/or media may or may not be of the same type. Further, the information consolidated in the physical storage array (144) may be arranged by way of the filesystem (142) (described above). In one embodiment of the invention, the physical storage array (144) may be implemented using persistent (i.e., non-volatile) storage. Examples of persistent storage include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the physical storage array (144) may store one or more replica virtual machine disk sets (146A-146N). Each replica virtual machine disk set (146A-146N) may be a copy of a corresponding virtual machine disk set that resides on the LCS (see e.g., FIG. 1B). Subsequently, each replica virtual machine disk set (146A-146N) may represent a collection of one or more replica virtual machine disks (not shown), which retain copies of snapshots of state pertaining to a corresponding virtual machine at various recovery points-in-time. That is, the cardinality of replica virtual machine disk sets (146A-146N) matches the cardinality of virtual machines and the cardinality of virtual machine disk sets, thus ensuring a one-to-one mapping between replica virtual machine disk sets (146A-146N) and virtual machines, as well as between replica virtual machine disk sets (146A-146N) and virtual machine disk sets. Further, each replica virtual machine disk (not shown) of a replica virtual machine disk set (146A-146N) may be a logical container, a data object, or a data structure that stores copies of virtual machine state and associated metadata. Moreover, each replica virtual machine disk (not shown) may span across one or more physical storage devices and/or media that implement, at least in part, the physical storage array (144).

Figure 2A:
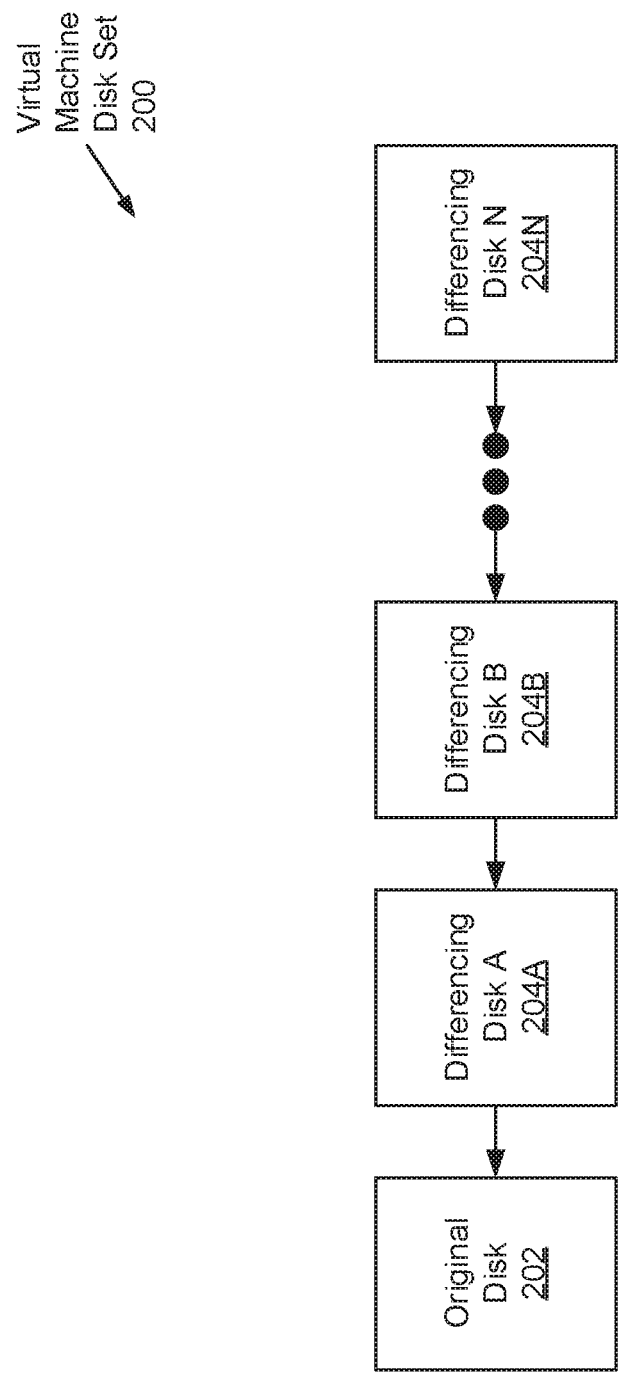
FIG. 2A shows a virtual machine disk set in accordance with one or more embodiments of the invention.

FIG. 2A shows a virtual machine disk set in accordance with one or more embodiments of the invention. As described above, a virtual machine disk set (200) may represent a collection of one or more virtual machine disks. The first virtual machine disk in any virtual machine disk set (200) may be an original disk (202), which may be created upon the instantiation of the associated virtual machine. The original disk (202) may be considered the root virtual machine disk from which all other subsequent virtual machine disks depend. Further, the original disk (202) may be the sole virtual machine disk, of a virtual machine disk set (200), that stores or specifies all virtual machine state (i.e., all data files and metadata) pertinent to an associated virtual machine, rather than changes to virtual machine state.

In one embodiment of the invention, any subsequently created virtual machine disks (e.g., a second, third, fourth, etc., virtual machine disk), of a virtual machine disk set (200), may each be a differencing disk (204A-204N). A differencing disk (204A-204N) may refer to a virtual machine disk that stores or specifies changes to virtual machine state representative of a previously created (or parent) virtual machine disk. That is, for example, a first differencing disk (204A) may store/specify a first set of changes to virtual machine state representative of the original disk (202); a second differencing disk (204B) may store/specify a second set of changes to virtual machine state representative of the first differencing disk (204A); and so forth. Further, each differencing disk (204A-204N) maintains a parent-child relationship with either the original disk (202) or another differencing disk (204A-204N). Differencing disks (204A-204N) may be created, and thus appended to a virtual machine disk set (200), in the aftermath of the performance of a backup operation or the creation of a checkpoint. Moreover, in one embodiment of the invention, virtual machine disks may be linked to another in accordance with a disk backup chain. A disk backup chain, for a given virtual machine, may refer to a sequence of virtual machine disks that records the appropriate order in which initial information and changes to the given virtual machine are sequenced to guarantee a proper restoration of the virtual machine.

Figure 2B:
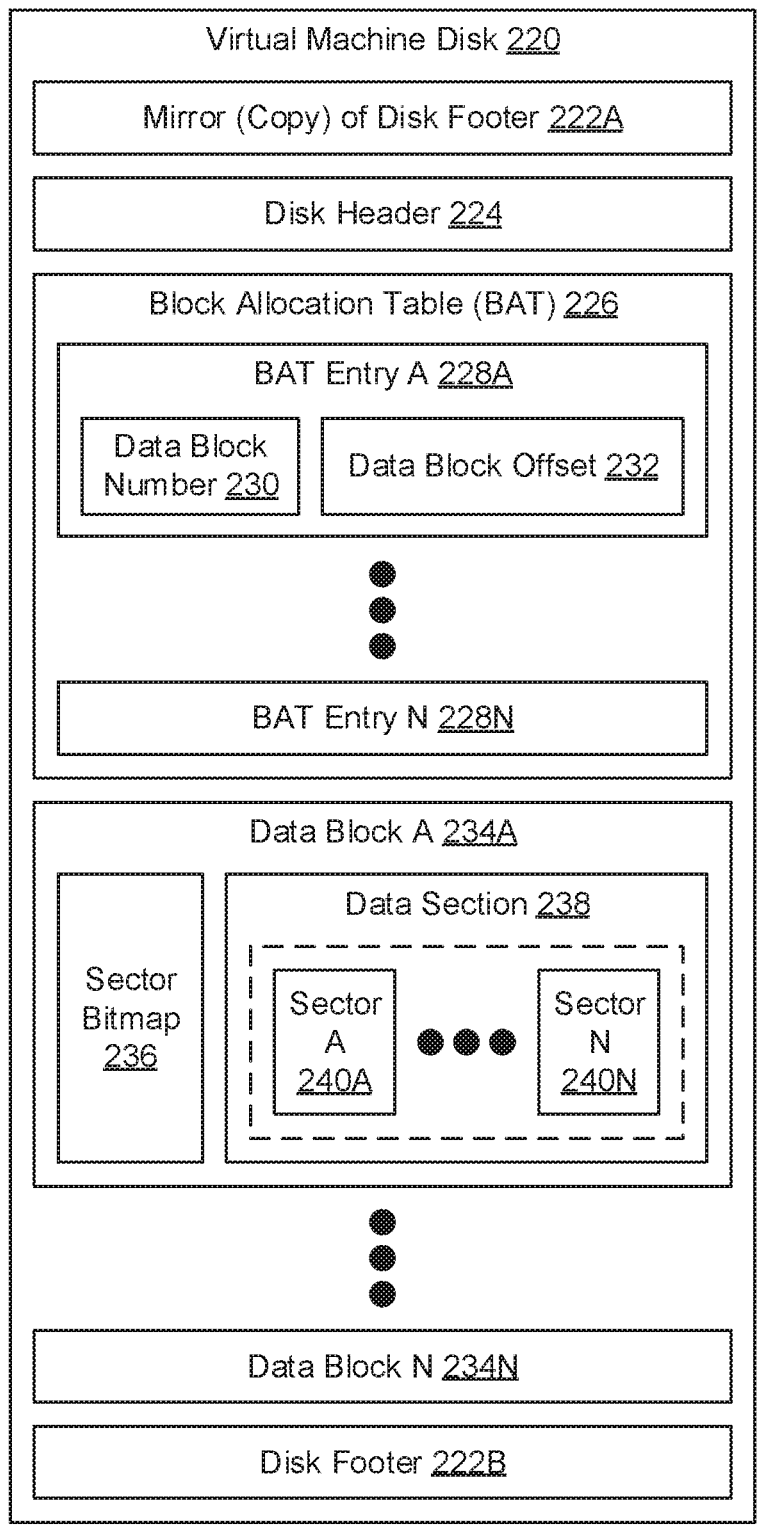
FIG. 2B shows a virtual machine disk in accordance with one or more embodiments of the invention.

FIG. 2B shows a virtual machine disk in accordance with one or more embodiments of the invention. A virtual machine disk (220) may be a logical container, a data object, or a data structure that stores virtual machine state and associated metadata. Specifically, a virtual machine disk (220) may include a mirror (or copy) of a disk footer (222A), a disk header (224), a block allocation table (BAT) (226), zero or more data blocks (234A-234N), and a disk footer (222B). Each of these components is described below.

In one embodiment of the invention, the mirror (or copy) of a disk footer (222A) may refer to a copy of the metadata contained in the disk footer (222B). Metadata contained in the disk footer (222B), as well as the mirror/copy of the disk footer (222A), may be directed to describing the virtual machine disk (220) and/or one or more other components found therein. Examples of metadata contained in the disk footer (222B) include, but are not limited to, virtual machine disk (220) format information, creation information, virtual machine disk (220) size information, unique identification information, checksum information, etc.

In one embodiment of the invention, the disk header (224) may refer to an additional collection of metadata directed to further describing the virtual machine disk (220) and/or one or more other components found therein. Examples of metadata contained in the disk header (224) include, but are not limited to, relative offset information for one or more components (e.g., the BAT (226)) in the virtual machine disk (220), header version information, BAT entry information (e.g., the number of BAT entries presently specified in the BAT (226)), data block size information, additional checksum information, parent disk identification information (granted the virtual machine disk (220) is a differencing disk), etc.

In one embodiment of the invention, the BAT (226) may refer to a data object or structure that stores and tracks data block offsets (232) for one or more data blocks (234A-234N) contained in the virtual machine disk (220). These data block offsets (232) may be tracked in the form of one or more BAT entries (228A-228N). Subsequently, each BAT entry (228A-228N) may include a data block number (230) and corresponding data block offset (232). The data block number (230) may refer to a unique identifier that may be assigned to a respective data block (234A-234N). Further, the data block offset (232) may refer to a distance (or displacement), expressed as a byte count, between the beginning of the virtual machine disk (220) and the beginning of the respective data block (234A-234N) with which the data block offset (232) is associated. Said another way, a data block offset (232) may represent a position in the virtual machine disk (220) where the respective data block (234A-234N) is stored, where the position is relative to the start of the virtual machine disk (220).

In one embodiment of the invention, each data block (234A-234N) may refer to a sequence of physically adjacent bytes, in the virtual machine disk (220), that retains some granularity of data (e.g., some granularity of virtual machine state and/or associated metadata). Information retained in each data block (234A-234N) may include a sector bitmap (236) and a data section (238). The sector bitmap (236) may refer to a bit array that indicates descriptive information pertaining to the data section (238). Specifically, for a non-differencing disk (i.e., an original disk) (described above), the sector bitmap (236) may distinguish which one or more disk sectors (240A-240N) (described below) of the data section (238) may be occupied with data and, conversely, which one or more other disk sectors (240A-240N) may yet to be populated with data. In contrast, for a differencing disk, the sector bitmap (236) may distinguish which one or more disk sectors (240A-240N) of the data section (238) may represent data that has been changed (respective to the data stored in the same disk sector(s) in a parent disk of the differencing disk). The sector bitmap (236), for a differencing disk, may also distinguish which one or more other disk sectors (240A-240N) may represent unchanged data respective to the data stored in the same disk sector(s) in the parent disk.

In one embodiment of the invention, the data section (238) may refer to a partition, defined in each data block (234A-234N), which may store the actual data (e.g., virtual machine state) representative of the data block (234A-234N) across one or more disk sectors (240A-240N). Further, each disk sector (240A-240N) may represent a subset of the sequence of physically adjacent bytes, in the virtual machine disk (220), representative of the data block (234A-234N) within which the disk sector (240A-240N) resides. Accordingly, each disk sector (240A-240N) may store some granularity of virtual machine state consolidated in the virtual machine disk (220).

Figure 2C:
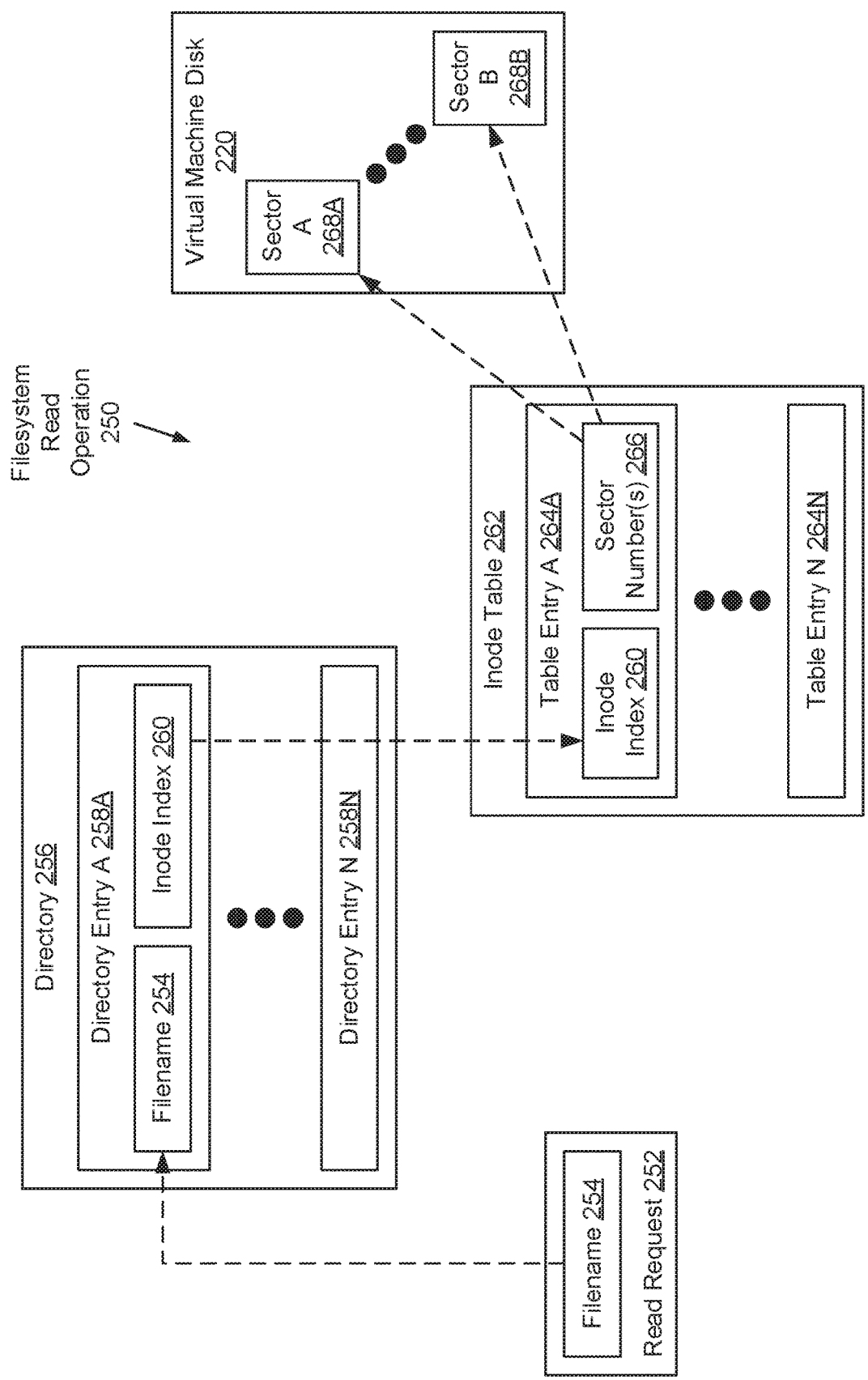
FIG. 2C shows a file system read operation in accordance with one or more embodiments of the invention.

FIG. 2C shows a filesystem read operation in accordance with one or more embodiments of the invention. A filesystem read operation (250) may pertain to the traversing of appropriate filesystem objects or structures directed to mapping any given filename (254) to one or more disk sectors (268A-268B) of a virtual machine disk (220). These disk sector(s) (268A-268B) may store the particular information associated with the given filename (254). In one embodiment of the invention, a filesystem read operation (250) may rely on at least two filesystem objects/structures—i.e., a directory (256) and an inode table (262). Each of these filesystem objects/structures is described below.

In one embodiment of the invention, the directory (256) may represent a filesystem object or structure for storing filename to inode index mappings. These mappings may be tracked in the form of one or more directory entries (258A-258N). Subsequently, each directory entry (258A-258N) may include a filename (254) and an inode index (260). A filename (254) may refer to a string of characters (e.g., letters, numbers, symbols, etc.) that may uniquely identify a data object—e.g., a file—representative of some data stored in the filesystem. An inode index (260), on the other hand, may represent an index into a particular table entry (264A-264N) of the inode table (262). One of ordinary skill will appreciate that each directory entry (258A-258N) may include additional information without departing from the scope of the invention. For example, each directory entry (258A-258N) may also specify a directory entry length (not shown), which may indicate the length of a respective directory entry in bytes.

In one embodiment of the invention, the inode table (262) may represent a filesystem object or structure for storing inode index to sector number mappings. These mappings may be tracked in the form of one or more table entries (264A-264N). Subsequently, each table entry (264A-264N) may include an inode index (260) and one or more sector numbers (266). An inode index (260), other than the definition provided above, may serve to uniquely identify the table entry (264A-264N) within which the inode index (260) is retained. Further, each sector number (266) may refer to a unique identifier that may reference (or point to) a respective disk sector (268A-268B) of a data block (not shown) stored in a virtual machine disk (220). One of ordinary skill will appreciate that each table entry (264A-264N) may include additional information without departing from the scope of the invention. For example, each table entry (264A-264N) may also specify other data object (e.g., file) metadata such as ownership information, permissions information, data object type information, data object size information, etc.

With respect to performing a filesystem read operation (250) for a given received read request (252), the following sequence of steps may transpire: (a) from the read request (252), the filename (254) may be obtained; (b) using the obtained filename (254), a lookup may be performed on the directory (256) to identify a directory entry (258A-258N) that specifies the filename (254); (c) from the identified directory entry (258A-258N), an inode index (260) corresponding to the filename (254) may be obtained; (d) using the obtained inode index (260), a lookup may be performed on the inode table (262) to identify a table entry (264A-264N) that specifies the inode index (260); (e) from the identified table entry (264A-264N), one or more sector numbers (266) corresponding to the inode index (260) may be obtained; and (f) using the obtained sector number(s) (266), one or more corresponding disk sectors (268A-268B) on a virtual machine disk (220) may be identified, where information contained in those identified disk sectors (268A-268B) may be accessed and/or retrieved.

Figure 2D:
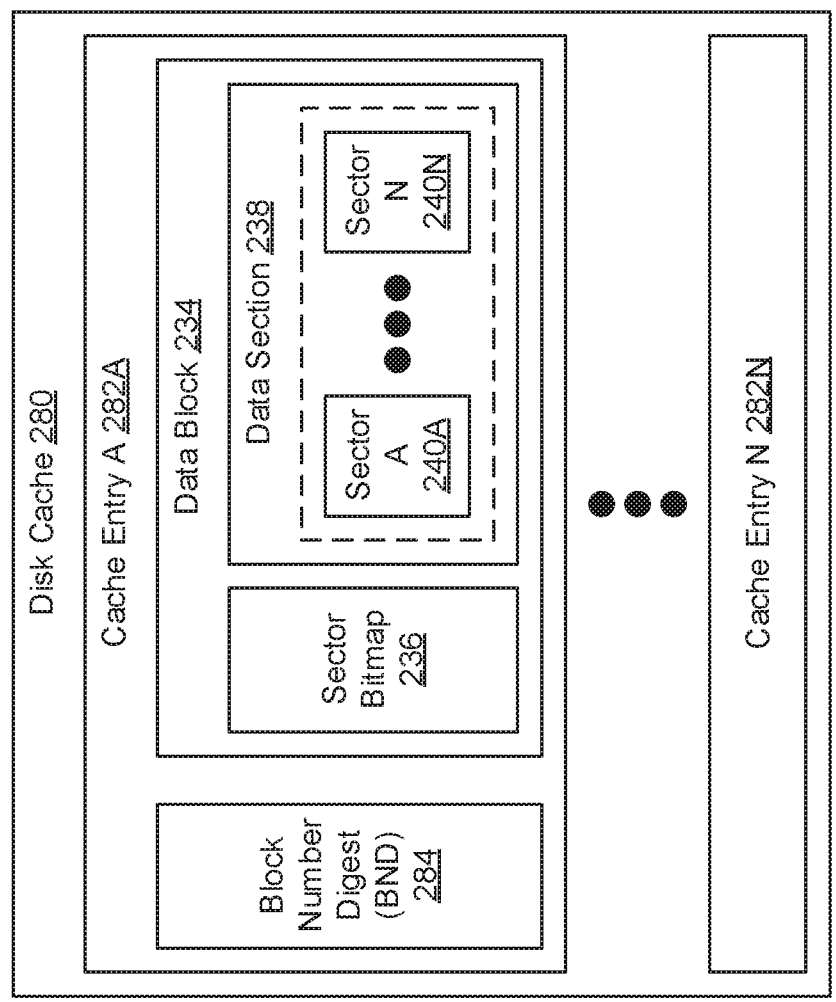
FIG. 2D shows a disk cache in accordance with one or more embodiments of the invention.

FIG. 2D shows a disk cache in accordance with one or more embodiments of the invention. As described above, the disk cache (280) may refer to a buffer or, alternatively, a logical partition of physical storage, where the most recent and/or most frequently accessed data may be stored. Information buffered in the disk cache (280) may be organized through one or more cache entries (282A-282N). Further, each cache entry (282A-282N) may store a block number digest (BND) (284) and a data block (234). Each of these data items is described below.

In one embodiment of the invention, the BND (284) may refer to the obtained output resulting from the subjection of a data block number through a hashing function. A hashing function may refer to any function that may map data of arbitrary size to data of a fixed size. To that end, a hashing function may employ one or more cryptographic algorithms, which transform the inputted data (e.g., the data block number) to a deterministic signature (e.g., the BND (284)). Further, a data block number may refer to a unique identifier that may be assigned to the data block (234).

In one embodiment of the invention, the data block (234) may refer to a sequence of physically adjacent bytes, in a virtual machine disk, that retains some granularity of data (e.g., some granularity of virtual machine state and/or associated metadata). Information retained in the data block (234) may include a sector bitmap (236) and a data section (238). The sector bitmap (236) may refer to a bit array that indicates descriptive information pertaining to the data section (238). Specifically, for a non-differencing disk (i.e., an original disk) (described above), the sector bitmap (236) may distinguish which one or more disk sectors (240A-240N) (described below) of the data section (238) may be occupied with data and, conversely, which one or more other disk sectors (240A-240N) may yet to be populated with data. In contrast, for a differencing disk, the sector bitmap (236) may distinguish which one or more disk sectors (240A-240N) of the data section (238) may represent data that has been changed (respective to the data stored in the same disk sector(s) in a parent disk of the differencing disk). The sector bitmap (236), for a differencing disk, may also distinguish which one or more other disk sectors (240A-240N) may represent unchanged data respective to the data stored in the same disk sector(s) in the parent disk.

In one embodiment of the invention, the data section (238) may refer to a partition, defined in the data block (234), which may store the actual data (e.g., virtual machine state) representative of the data block (234) across one or more disk sectors (240A-240N). Each disk sector (240A-240N) may represent a subset of the sequence of physically adjacent bytes, in a virtual machine disk, representative of the data block (234). Accordingly, each disk sector (240A-240N) may store some granularity of virtual machine state consolidated in the virtual machine disk.

FIGS. 3A-3F show flowcharts describing a method for instantly accessing virtual machine state while virtual machine restoration is underway in parallel in accordance with one or more embodiments of the invention. The various steps outlined below may be performed by the virtual machine backup intelligence (VMBI) executing on the local computing system (LCS) (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Figure 3A:
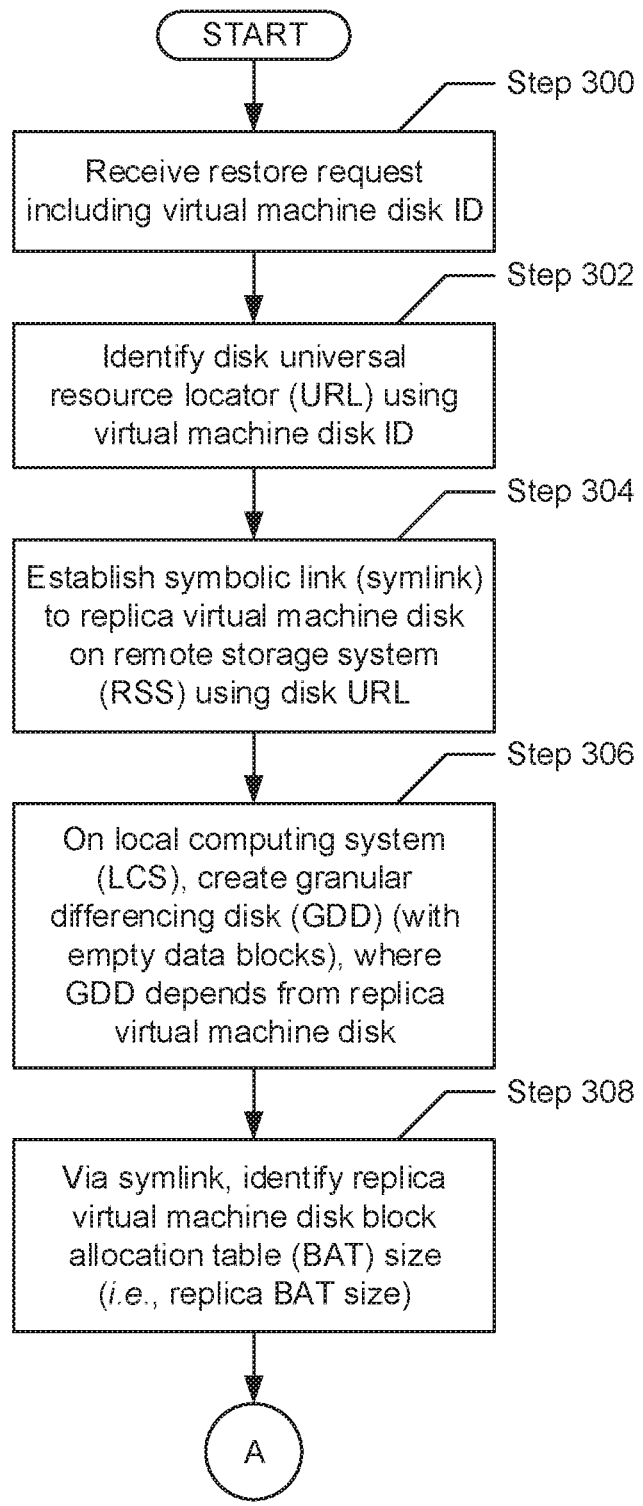
FIGS. 3A-3F show flowcharts describing a method for instantly accessing virtual machine state while virtual machine restoration is underway in parallel in accordance with one or more embodiments of the invention.

Turning to FIG. 3A, in Step 300, a restore request is received. In one embodiment of the invention, the restore request may pertain to performing a restoration operation (i.e., restoration of a virtual machine). Further, the restore request may specify a virtual machine identifier (ID) associated with the virtual machine (i.e., the target virtual machine) for which the restoration operation is to be performed.

In Step 302, using the virtual machine ID (obtained in Step 300), a disk universal resource locator (URL) is identified. In one embodiment of the invention, a disk URL may represent a web (e.g., Internet) address or reference to a replica virtual machine disk. As mentioned above, replica virtual machine disks may reside on virtual machine backup, archiving, and/or disaster recovery platforms such as, for example, the remote storage system (RSS) (see e.g., FIG. 1C). Subsequently, the disk URL associated with the obtained virtual machine ID may refer to a web address or reference to a replica virtual machine disk (residing on the RSS) that may store the necessary replicated virtual machine state to restore the target virtual machine.

In Step 304, using the disk URL (identified in Step 302), a symbolic link (i.e., symlink) is established. In one embodiment of the invention, a symbolic link may refer to a first filesystem object (e.g., a directory) that references (or points to) a second filesystem object (e.g., another directory), which thus enables the information stored under the second filesystem object to become accessible through the first filesystem object. Further, the first and second filesystem objects may belong to a same filesystem or, alternatively, each may belong to different filesystems. In the instant case, a symbolic link may be established between physical storage on the LCS (see e.g., FIG. 1B) and physical storage, or more particularly, a replica virtual machine disk stored in physical storage, on the RSS (see e.g., FIG. 1C). The replica virtual machine disk, with which the symbolic link is at least in part established, may be referenced by or associated with the identified disk URL. Accordingly, the replica virtual machine disk may serve as the RSS-side end point for the symbolic link.

In Step 306, a granular differencing disk (GDD) (see e.g., FIG. 1B) is created on physical storage at the LCS. In one embodiment of the invention, the GDD may be created to serve as the LCS-side end point for the symbolic link. Subsequently, the GDD may represent the local mount point for the replica virtual machine disk that serves as the RSS-side end point for the symbolic link. Further, the GDD may be initialized to include zero data blocks and an unpopulated block allocation table (BAT) (see e.g., FIG. 2B). Moreover, as a differencing disk, the GDD may be designated as the child disk to the aforementioned replica virtual machine disk on the RSS.

In Step 308, a block allocation table (BAT) size for a BAT on the replica virtual machine disk is identified. In one embodiment of the invention, the BAT size may refer to the cardinality (i.e., number) of BAT entries (see e.g., FIG. 2B) stored in the replica virtual machine disk BAT, which may translate to the cardinality (i.e., number) of data blocks stored in the replica virtual machine disk. Further, the aforementioned BAT size may be identified from the disk header information on the replica virtual machine disk. Moreover, the BAT size may be identified through the symbolic link (established in Step 304).

Figure 3B:
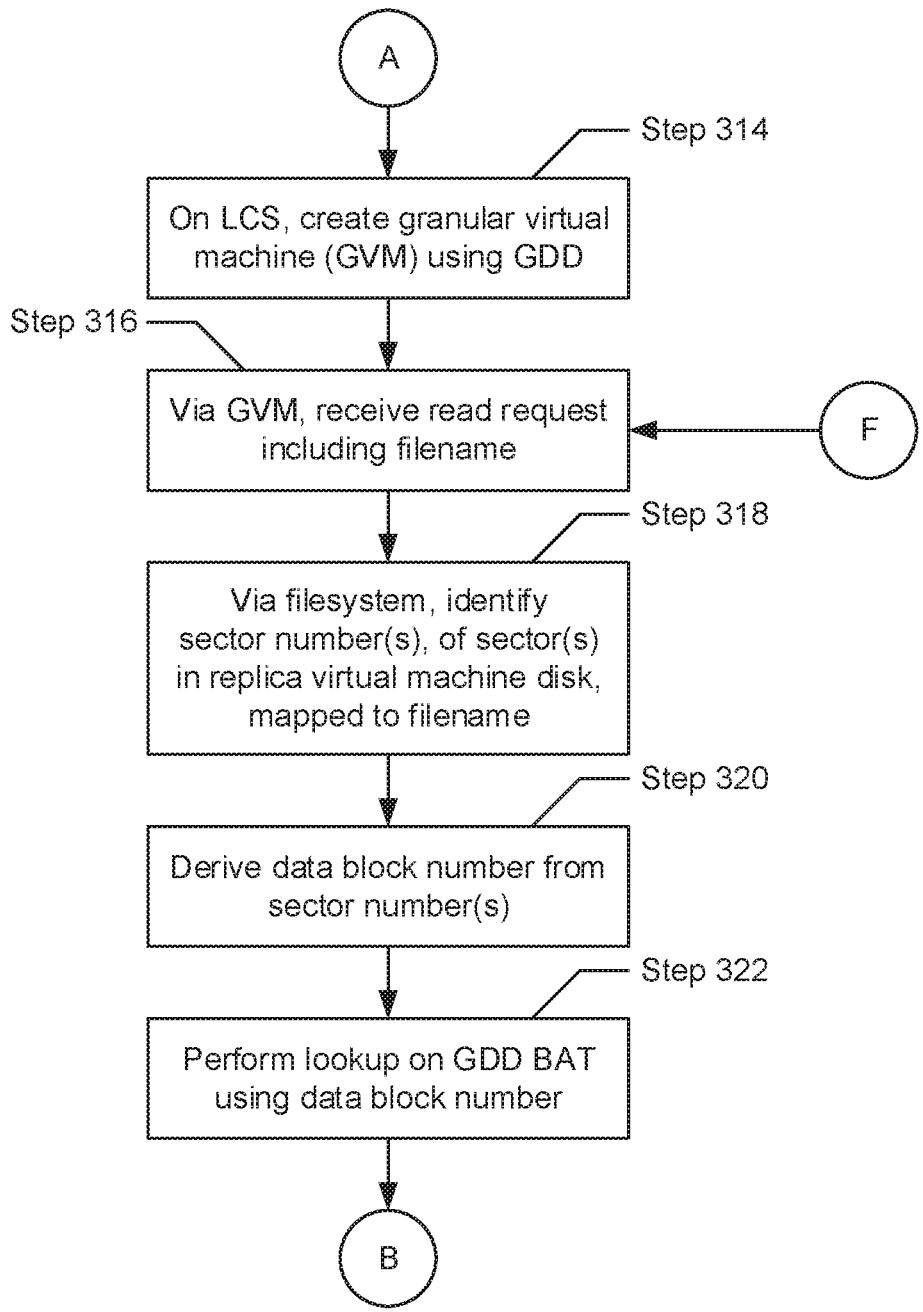

Turning to FIG. 3B, in Step 314, using the GDD (created in Step 306), a granular virtual machine (GVM) is created at the LCS. In one embodiment of the invention, the GVM may represent a specialized virtual machine that may serve as a portal or interface, which when interacted with by a user, enables the user to instantly access any granularity of virtual machine state stored on the above-mentioned replica virtual machine disk. Further, the GVM may be created from at least a portion of the information (e.g., data and/or metadata) stored in the replica virtual machine disk (see e.g., FIG. 2B). This information may have been retrieved through the symbolic link (established in Step 304) and in response to a read request submitted there-through by the VMBI executing on the LCS.

In Step 316, from user interaction via the GVM (created in Step 314), a read request is received. In one embodiment of the invention, the read request may pertain to accessing and/or retrieving particular information stored on the replica virtual machine disk. Further, the read request may include a filename with which the particular information may be associated.

In Step 318, using the filesystem on the RSS, one or more sector numbers is/are identified. In one embodiment of the invention, each sector number may refer to a unique identifier that may reference (or point to) a respective disk sector of a data block stored in the replica virtual machine disk (see e.g., FIG. 2B). Further, each disk sector may store, at least in part, the data with which the filename (obtained in Step 316) is associated. Mapping of the filename to the identified sector number(s) may entail performing a filesystem read operation (see e.g., FIG. 2C).

In Step 320, a data block number is derived from the one or more sector numbers (identified in Step 318). Specifically, in one embodiment of the invention, a data block number may refer to a unique identifier that may be assigned to a respective data block stored in the replica virtual machine disk (see e.g., FIG. 2B). Further, derivation of the data block number may entail: obtaining, from the replica virtual machine disk, a data block size value specified in the disk header therein; and using the sector number(s) in conjunction with the obtained data block size value to determine the data block number. In one embodiment of the invention, the obtained data block size value may disclose the number of disk sectors that exist within the data section of each data block stored in the replica virtual machine disk. With the obtained data block size value (i.e., a disk sectors per data block value), the data block number respective to the sector number(s) may be derived using the following mathematical expression:

Data Block Number=floor(Sector Number/Data Block Size Value)

In Step 322, using the data block number (derived in Step 320), a lookup is performed on the GDD BAT (see e.g., FIG. 2B). In one embodiment of the invention, the lookup may entail searching the GDD BAT for a table entry that specifies the data block number.

Figure 3C:
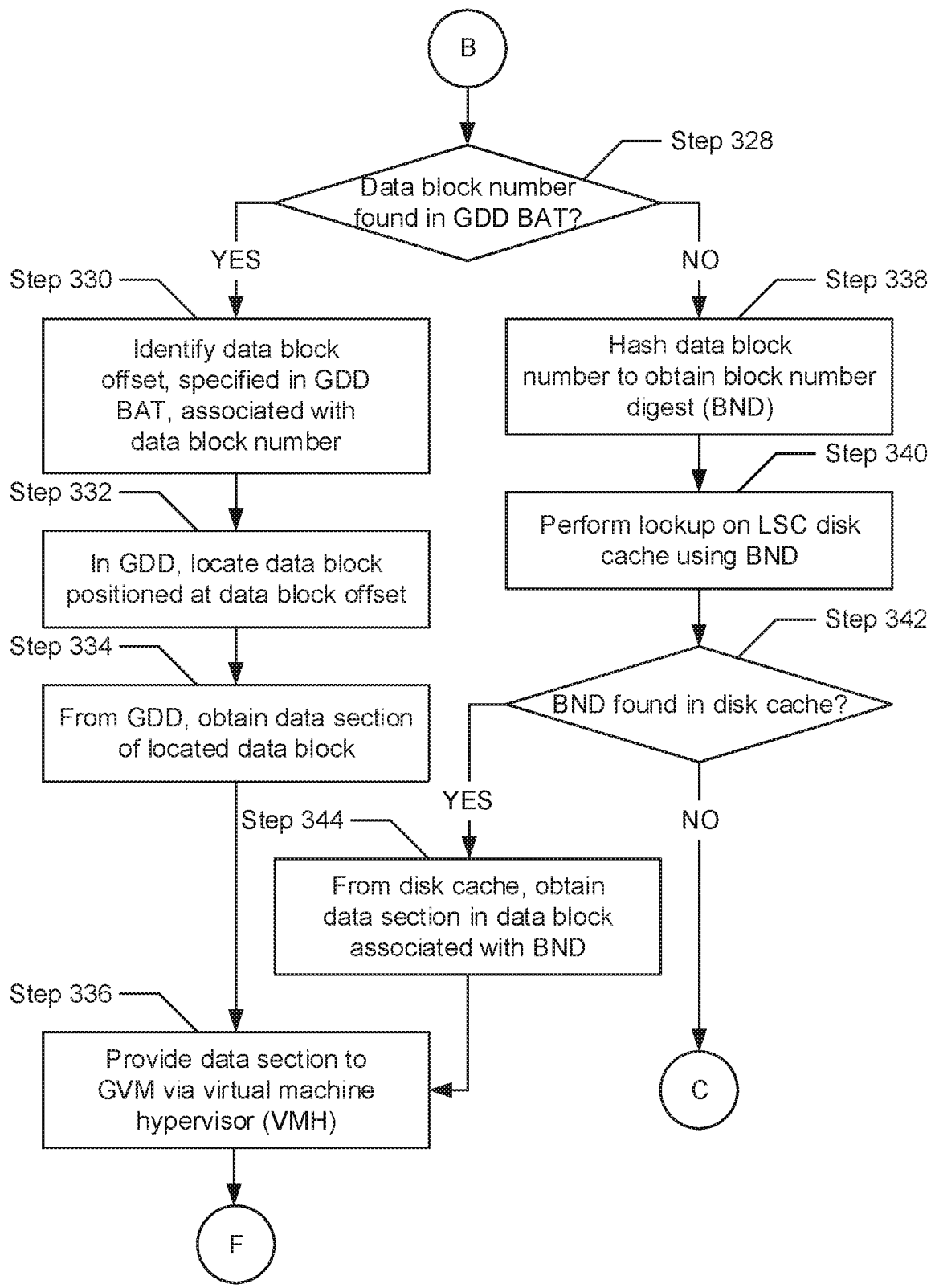

Turning to FIG. 3C, in step 328, a determination is made, based on the lookup (performed in Step 322), as to whether the data block number (derived in Step 320) is stored in the GDD BAT. That is, in one embodiment of the invention, if it is determined that a table entry specifies the data block number, then the process may proceed to Step 330. On the other hand, in another embodiment of the invention, if it is alternatively determined that none of the table entries specify the data block number, then the process may alternatively proceed to Step 338.

In Step 330, after determining (in Step 328) that a table entry of the GDD BAT specifies the data block number (derived in Step 320), a data block offset is identified. In one embodiment of the invention, the data block offset may represent the other data item specified in the table entry (identified through the determination of Step 328). Subsequently, the data block offset may be associated with the data block number, and thus, may indicate a distance (or displacement), expressed as a byte count, between the beginning of the GDD and the beginning of the respective data block with which the data block offset is associated. Said another way, the data block offset may represent a position in the GDD where a respective data block may be stored, where the position is relative to the start of the GDD.

In Step 332, a data block, respective to the data block number, is located on the GDD. In one embodiment of the invention, the data block may be positioned in the GDD at the byte count specified by the data block offset (identified in Step 330). Afterwards, in Step 334, a data section of the data block (located in Step 332) is obtained. Specifically, in one embodiment of the invention, in knowing the fixed byte lengths of the sector bitmap and the data section of the data block, obtaining the data section may entail: (a) identifying a data section offset by adding the sector bitmap byte length to the data block offset; and (b) reading a set of bytes equivalent to the data section byte length from the identified data section offset. The data section of the data block may refer to a partition, defined therein, which stores, at least in part, the actual virtual machine state representative of the data block across one or more disk sectors.

In Step 336, the data section (obtained in Step 334) is subsequently provided to the GVM (created in Step 314). Specifically, the data section may be provided to the GVM through the virtual machine hypervisor (VMH) (see e.g., FIG. 1B), which may be executing on the LCS and may be responsible for managing communications, information exchange, and/or resource sharing between at least the GVM and other components of the LCS (e.g., the VMBI executing thereon, etc.). Thereafter, having received the data section, the GVM may present the granularity of virtual machine state enclosed therein to the user whom may be interacting with the GVM. Subsequently, the process may proceed to Step 316 (see e.g., FIG. 3B), where another read request may be received and processed.

In Step 338, after alternatively determining (in Step 328) that none of the table entries of the GDD BAT specify the data block number (derived in Step 320), the data block number is subsequently hashed to obtain a block number digest (BND). In one embodiment of the invention, hashing of the data block number may entail subjecting the data block number through a hashing function. A hashing function may refer to any function that may map data of arbitrary size to data of a fixed size. To that end, a hashing function may employ one or more cryptographic algorithms, which transform the inputted data (e.g., the data block number) to a deterministic signature (e.g., the BND).

In Step 340, using the BND (obtained in Step 338), a lookup is performed on the disk cache stored on physical storage at the LCS. In one embodiment of the invention, the lookup may entail searching the disk cache for a cache entry that specifies the BND (see e.g., FIG. 2D).

In Step 342, a determination is made, based on the lookup (performed in Step 340), as to whether the BND (obtained in Step 338) is stored in the disk cache. In one embodiment of the invention, if it is determined that a cache entry of the disk cache specifies the BND, then the process may proceed to Step 344. On the other hand, in another embodiment of the invention, if it is alternatively determined that none of the cache entries of the disk cache specify the BND, then the process may alternatively proceed to Step 350 (see e.g., FIG. 3D).

In Step 344, after determining (in Step 342) that a cache entry of the disk cache specifies the BND (obtained in Step 338), a data block (see e.g., FIG. 2D) also specified in the identified cache entry is accessed. In one embodiment of the invention, the data block may have been previously cached in the disk cache after being retrieved from the replica virtual machine disk, via the symbolic link, in response to an earlier query (i.e., a previously submitted read request). Further, upon accessing the data block, a data section enclosed therein may be obtained. The data section of a data block may refer to a partition, defined therein, which stores, at least in part, the actual virtual machine state representative of the data block across one or more disk sectors (see e.g., FIG. 2D). Thereafter, the process may proceed to Step 336, where the data section (obtained in Step 344) is subsequently provided to the GVM (created in Step 314) via the VMH. Following the submission of the data section to the GVM (in Step 336), the process may proceed to Step 316 (see e.g., FIG. 3B), where another read request may be received and processed.

Figure 3D:
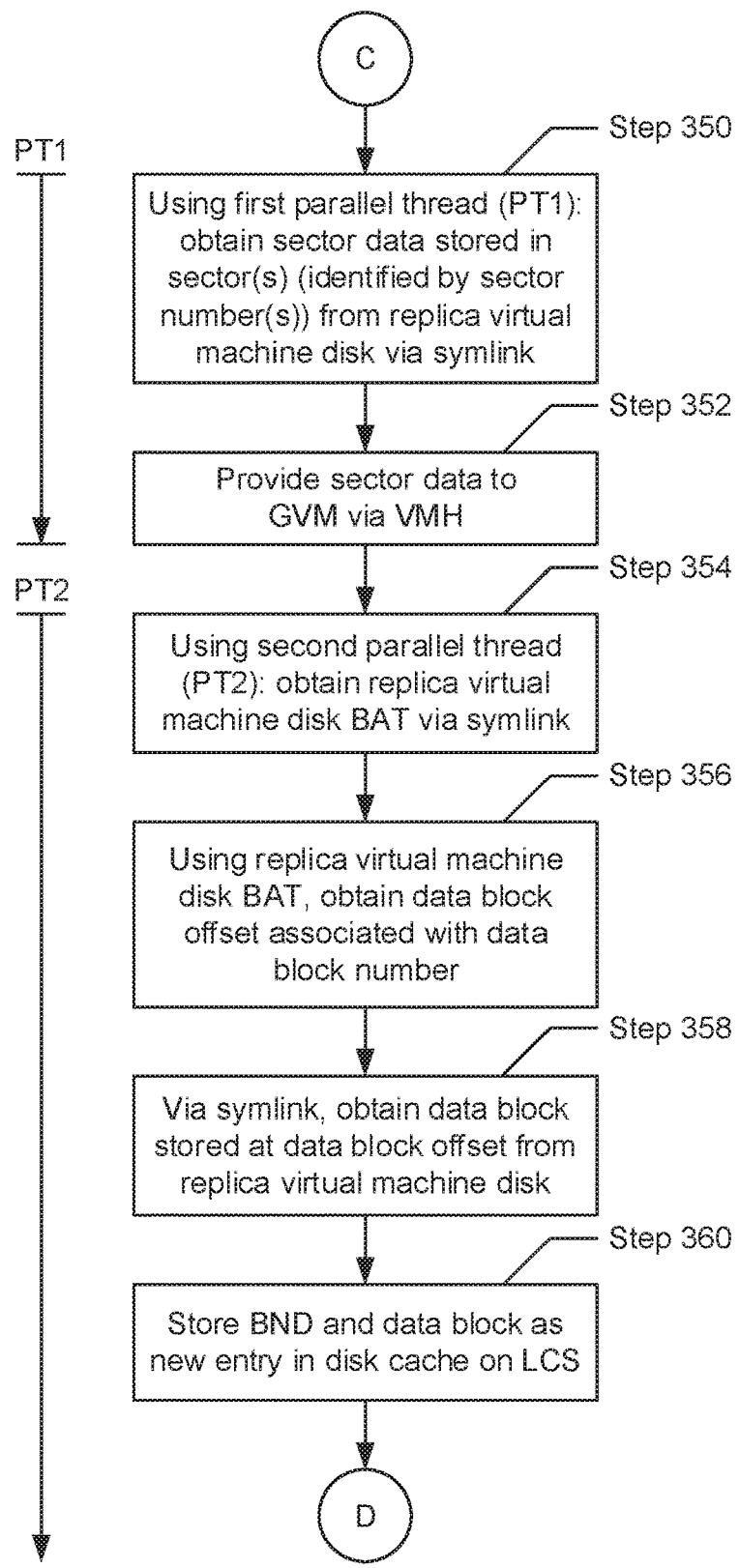

Turning to FIG. 3D, in Step 350, after alternatively determining (in Step 342) that none of the cache entries of the disk cache specify the BND (obtained in Step 338), two parallel threads are instantiated towards achieving different objectives hereinafter. With respect to the flowcharts, the first parallel thread may perform Steps 350 and 352 (i.e., a first set of steps) outlined below, whereas the second parallel thread may perform Steps 354 through 394 (i.e., a second set of steps) also outlined below. Further, though these first and second sets of steps are shown sequentially in the flowcharts, one of ordinary skill will appreciate that the first and second sets of steps are in fact performed in parallel (or concurrently) to one another. Moreover, a parallel thread may represent a smallest unit of processing performed by a computer program (e.g., an operating system (OS), an application, a virtual machine, etc.), where the computer program may spawn and manage the execution of multiple threads to enable multithreading or multitasking.

Specifically, in Step 350, a first parallel thread is instantiated, where through the first parallel thread, sector data stored in one or more disk sectors is obtained. In one embodiment of the invention, the disk sector(s), from which the sector data may be obtained, may pertain to the one or more sector numbers, respectively (identified in Step 318). Further, the obtained sector data may represent a granularity of virtual machine state, with which the filename (obtained via the read request received in Step 316), that may be stored in the replica virtual machine disk on the RSS. Moreover, the sector data may be obtained through the symbolic link (established in Step 304).

In Step 352, the sector data (obtained in Step 350) is subsequently provided to the GVM (created in Step 314). Specifically, the sector data may be provided to the GVM through the VMH (see e.g., FIG. 1B), which may be executing on the LCS and may be responsible for managing communications, information exchange, and/or resource sharing between at least the GVM and other components of the LCS (e.g., the VMBI executing thereon, etc.). Thereafter, having received the sector data, the GVM may present the granularity of virtual machine state representative of the sector data to the user whom may be interacting with the GVM.

In Step 354, in concurrence with the instantiation of the first parallel thread (in Step 3450), a second parallel thread is instantiated, where through the second parallel thread, a BAT of the replica virtual machine disk is obtained. In one embodiment of the invention, a BAT may refer to a data object or structure that stores and tracks data block offsets for one or more data blocks contained in a virtual machine disk (e.g., the replica virtual machine disk). Each data block offset may refer to a distance (or displacement), expressed as a byte count, between the beginning of the virtual machine disk and the beginning of the respective data block with which the data block offset is associated. Said another way, a data block offset may represent a position in the virtual machine disk where the respective data block is stored, where the position is relative to the start of the virtual machine disk. Moreover, the BAT may be obtained through the symbolic link (established in Step 304).

In Step 356, using the BAT (obtained in Step 354), a data block offset specified in the BAT is obtained. In one embodiment of the invention, obtaining of the data block offset, based on the BAT, may entail further using the data block number (derived in Step 320). More specifically, as mentioned above, the BAT may store and track data block offsets in the form of one or more BAT entries (see e.g., FIG. 2B). Further, each BAT entry may specify a data block number and a corresponding data block offset, which may both be associated with a particular data block contained in the virtual machine disk. Subsequently, obtaining of the data block offset may entail: performing a lookup on the BAT using the data block number to identify a BAT entry therein that specifies the data block number; and from the identified BAT entry, obtaining the corresponding data block offset also specified therein.

In Step 358, using the data block offset (obtained in Step 356), a data block is obtained. Specifically, in one embodiment of the invention, at least the beginning of the granularity of virtual machine state representative of the obtained data block may reside at the data block offset in the replica virtual machine disk. Further, retrieval of the data block may entail: establishing a data block length set for data blocks contained within the replica virtual machine disk, which may be disclosed in the disk header (see e.g., FIG. 2B); and obtaining a count of bytes positioned, in the replica virtual machine disk, from the data block offset (i.e., a beginning position) to an ending position that may be a data block length away relative to the data block offset. Information contained in the data block may include a sector bitmap (described above) and a data section, which stores, at least in part, the actual virtual machine state representative of the data block across one or more disk sectors. Moreover, the data block may be obtained through the symbolic link (established in Step 304).

In Step 360, a new cache entry is generated within the disk cache stored in the physical storage of the LCS. In one embodiment of the invention, information consolidated in the new cache entry may include the BND (obtained in Step 338) and the data block (obtained in Step 358).

In one embodiment of the invention, while the first parallel thread focuses on retrieving the granularity of virtual machine state particularly associated with the filename (obtained via the read request received in Step 316), the second parallel thread focuses, at least in part, on retrieving and caching other granularities of relatable virtual machine state. With respect to data consolidation on a virtual machine disk (or any disk for that matter), related data may often be stored across disk sectors that may be physically adjacent to one another. Further, there may be a high statistical probability that consecutive read requests, to access information stored on the virtual machine disk, may target relatable information residing across various disk sectors. In view of this, and in order to fast track access to relatable information (i.e., relatable granularities of virtual machine state) that may be targeted by subsequent read requests, embodiments of the invention, through the second parallel thread, retrieve and locally cache the disk sectors physical adjacent to the disk sectors associated with the sought filename Specifically, the various disk sectors physically adjacent to the filename-associated disk sectors may substantially reside within the same data block in which the filename-associated disk sectors themselves may reside.

Figure 3E:
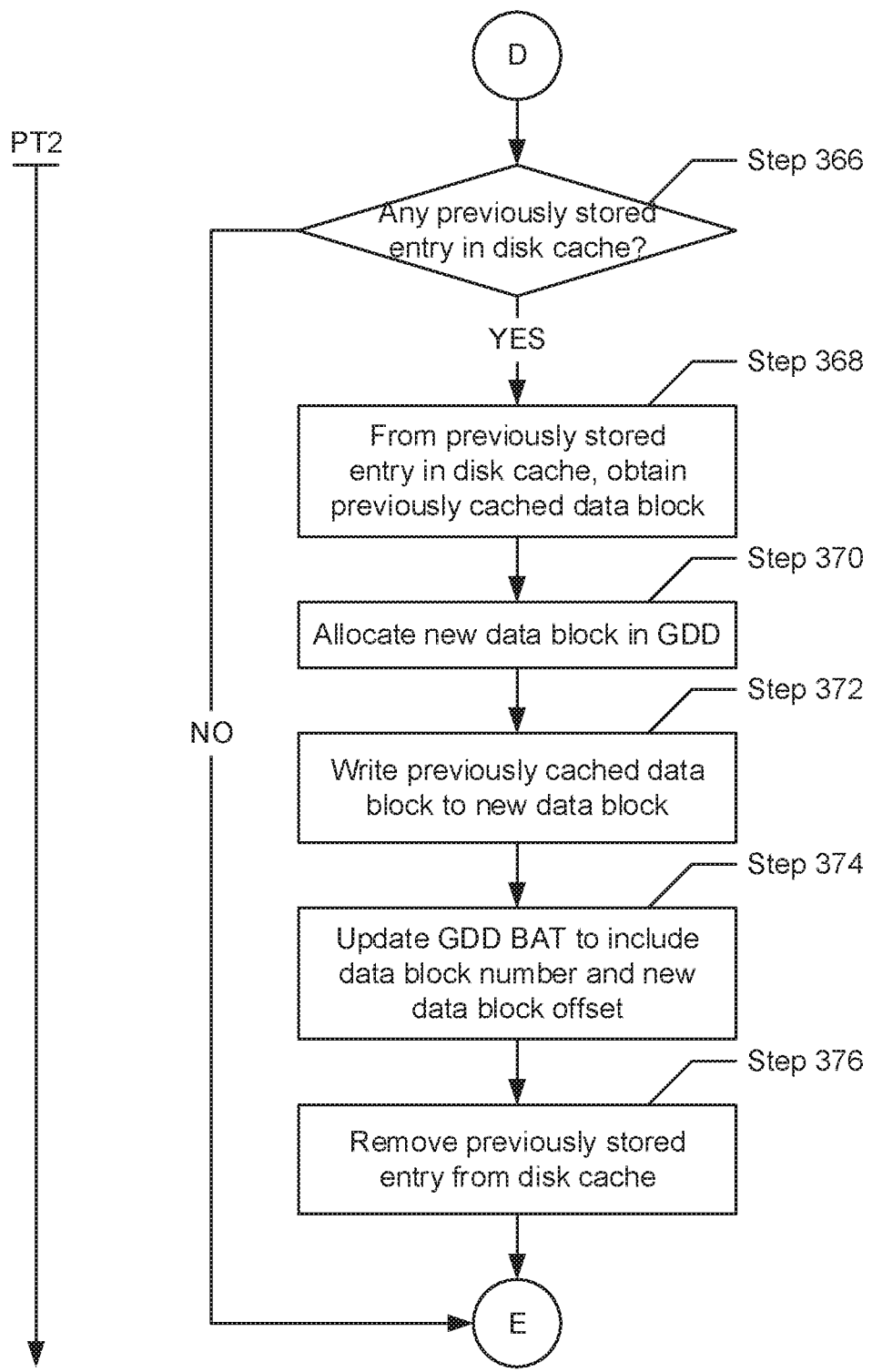

Turning to FIG. 3E, in Step 366, and further through the second parallel thread, a determination is made as to whether the disk cache includes any previously stored cache entries. In one embodiment of the invention, if it is determined that the disk cache includes at least another cache entry (other than the new cache entry created in Step 360), then the process may proceed to Step 368. On the other hand, if it is alternatively determined that the new cache entry (created in Step 360) is the only cache entry in the disk cache, then the process may alternatively proceed to Step 382 (see e.g., FIG. 3F).

In Step 368, after determining (in Step 366) that at least one other cache entry (other than the new cache entry created in Step 360) exists in the disk cache, a previously created and/or stored cache entry is identified. In one embodiment of the invention, the identified previously created/stored cache entry may refer to the oldest (or least recent) cache entry consolidated in the disk cache. In another embodiment of the invention, the identified previously created/stored cache entry may refer to the cache entry that may have been created and consolidated during processing of a previous read request that entailed granular virtual machine state retrieval from the replica virtual machine disk via the symbolic link. Further, upon identification of the previously created/stored cache entry, a previously cached data block specified therein, or particularly, the information in the previously cached data block (i.e., a previously cached data block content including a respective sector bitmap and a respective data section), may be obtained.

In Step 370, within the GDD (created in Step 306), a new data block is allocated. Specifically, in one embodiment of the invention, a new data block may be defined and subsequently appended to the set of existing data blocks (see e.g., FIG. 2B) contained in the GDD. Thereafter, in Step 372, the previously cached data block content (obtained from the disk cache in Step 368) is written to the new data block (allocated in Step 370).

In Step 374, after the previously cached data block content is written to the GDD, a BAT in the GDD is updated. In one embodiment of the invention, recall that a BAT stores and tracks data block offsets for one or more data blocks contained in a virtual machine disk (e.g., the GDD). Accordingly, updating of the GDD BAT may include creating and appending a new BAT entry. Further, the new BAT entry may specify the data block number (derived in Step 320) and a corresponding data block offset indicating the byte count position of the data block (allocated in Step 370), in the GDD, relative to the beginning of the GDD. Thereafter, in Step 376, the previously created/stored cache entry (identified in Step 368) is subsequently removed from the disk cache.

Figure 3F:
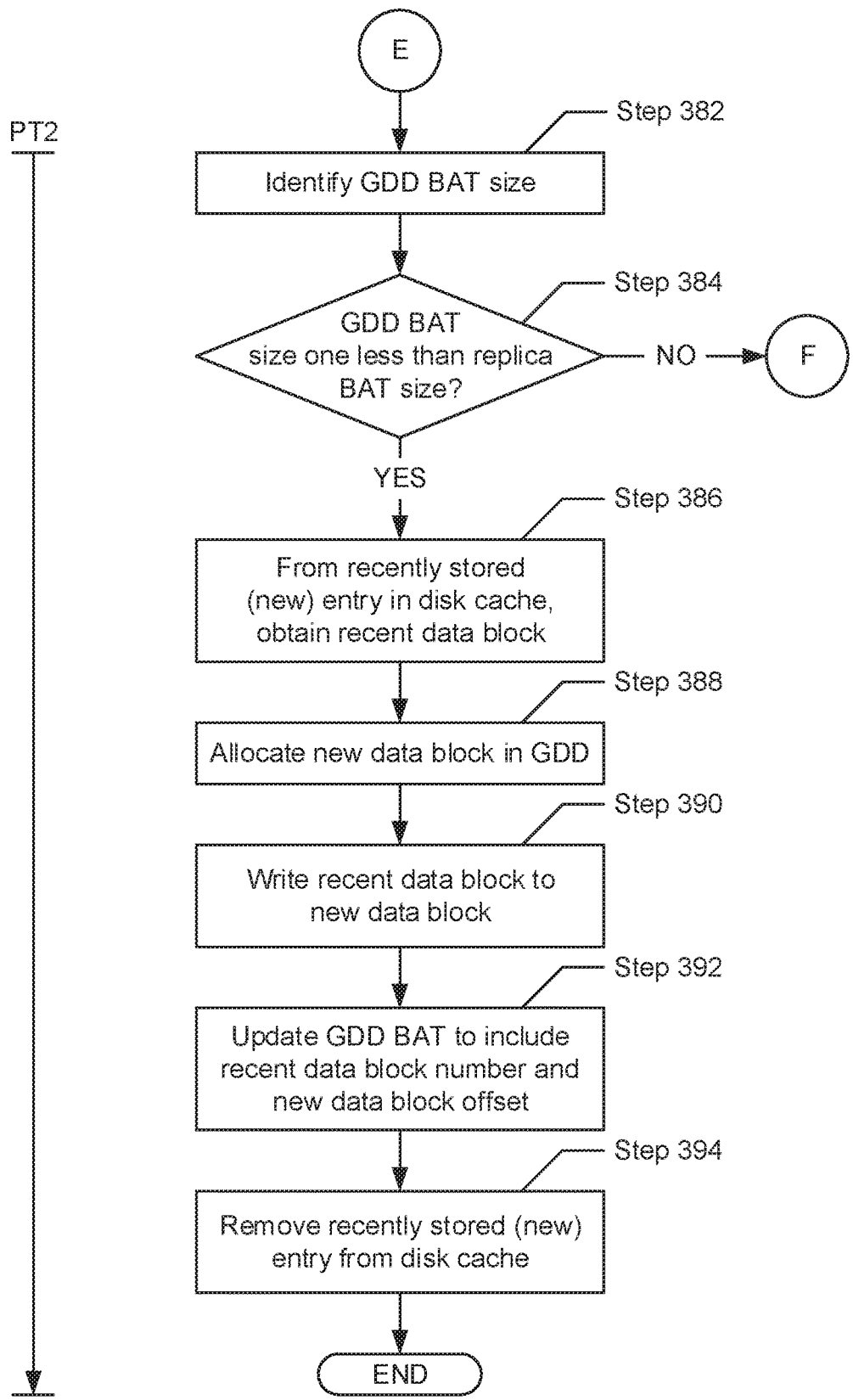

Turning to FIG. 3F, in Step 382, after alternatively determining (in Step 366) that the new cache entry (created in Step 360) is the sole cache entry in the disk cache or after removing a previously stored cache entry from the disk cache (in Step 376), a GDD BAT size is identified. In one embodiment of the invention, the GDD BAT size may refer to the cardinality (i.e., number) of BAT entries (see e.g., FIG. 2B) stored in the GDD BAT, which may translate to the cardinality (i.e., number) of data blocks stored in the GDD. Further, the GDD BAT size may be identified through the enumeration of existing BAT entries in the GDD.

In Step 384, a determination is made as to whether the GDD BAT size (identified in Step 382) is one less than the replica virtual machine disk BAT size (identified in Step 308). In one embodiment of the invention, if it is determined that the GDD BAT size is indeed one less than the replica virtual machine disk BAT size, then the new (recently stored) cache entry (created in Step 360) includes the last data block necessary to complete the virtual machine restoration process and, accordingly, the process may proceed to Step 386. On the other hand, if it is alternatively determined that the GDD BAT size is two (or more) less than the replica virtual machine disk BAT size, then the process may alternatively proceed to Step 316 (see e.g., FIG. 3B), where another read request may be received and processed.

In Step 386, after determining (in Step 384) that the GDD BAT size (identified in Step 382) is one less than the replica virtual machine disk BAT size (identified in Step 308), the data block recently stored in the new cache entry (created in Step 360) is obtained. Particularly, in one embodiment of the invention, the information in the aforementioned data block (i.e., a respective sector bitmap and a respective data section), may be obtained.

In Step 388, within the GDD, a new data block is allocated. Specifically, in one embodiment of the invention, a new data block may be defined and subsequently appended to the set of existing data blocks (see e.g., FIG. 2B) contained in the GDD. Thereafter, in Step 390, the data block content (obtained from the disk cache in Step 386) is written to the new data block (allocated in Step 388).

In Step 392, after the data block content (obtained in Step 386) is written to the GDD (in Step 390), a BAT in the GDD is updated. In one embodiment of the invention, recall that a BAT stores and tracks data block offsets for one or more data blocks contained in a virtual machine disk (e.g., the GDD). Accordingly, updating of the GDD BAT may include creating and appending a new BAT entry. Further, the new BAT entry may specify the data block number (derived in Step 320) and a corresponding data block offset indicating the byte count position of the data block (allocated in Step 388), in the GDD, relative to the beginning of the GDD. Thereafter, in Step 394, the new (recently stored) cache entry (created in Step 360) is subsequently removed from the disk cache.

In one embodiment of the invention, with the addition of new data block (allocated in Step 388), the GDD contains a copy of all data blocks (i.e., all virtual machine state) consolidated on the replica virtual machine disk on the RSS. Accordingly, restoration of the virtual machine (identified per the restore request received in Step 300) is completed, and the process ends. Subsequent read requests hereinafter may retrieve targeted virtual machine state directly from the GDD.

Figure 4:
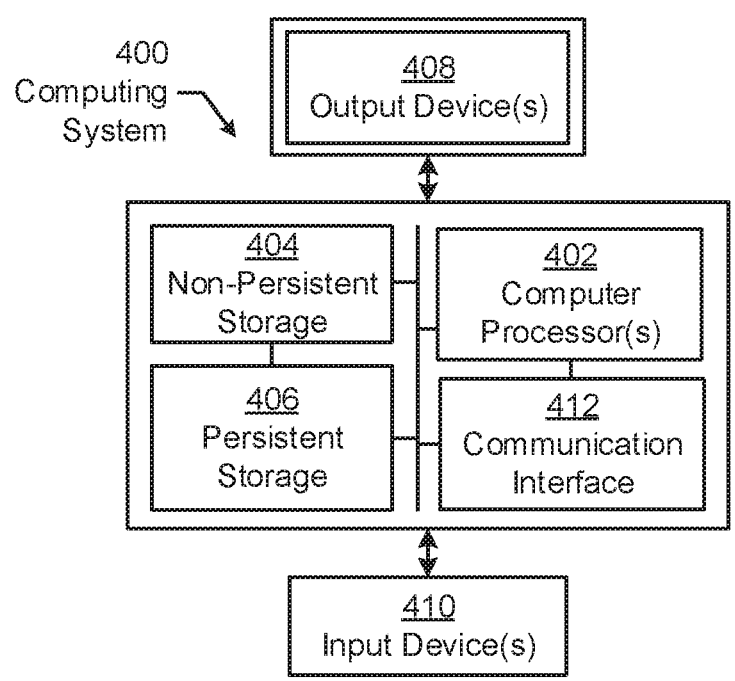
FIG. 4 shows a computing system in accordance with one or more embodiments of the invention.

FIG. 4 shows a computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention relate to an optimized solution for accessing virtual machine state while restoration of a respective virtual machine is underway. Prior to embodiments of the invention disclosed herein, accessibility of any virtual machine state would require waiting until reconstruction of the respective virtual machine had been completed. However, in implementing one or more embodiments of the invention, successive granularities of virtual machine state may be accessed while restoration of the respective virtual machine has yet to be completed in entirety. Further, through the implementation of disk caching and parallel threads, subsequent read requests targeting relatable virtual machine state may be fast tracked.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for retrieving data, comprising:
receiving, from a granular virtual machine (GVM), a first read request comprising a first filename;
mapping the first filename to a first sector number;
deriving a first data block number using the first sector number;
performing a first lookup on a block allocation table (BAT) specified in a granular differencing disk (GDD) using the first data block number;
making a first determination, based on the first lookup, that the BAT lacks the first data block number;
hashing, based on the first determination, the first data block number to obtain a first block number digest (BND);

performing a second lookup on a disk cache using the first BND;

making a second determination, based on the second lookup, that the disk cache lacks the first BND;

based on the second determination and through a first parallel thread:

obtaining, from a first replica virtual machine disk and through a symbolic link, first sector data stored at a first disk sector associated with the first sector number; and providing, in response to the first read request, the first sector data to the GVM.

2. The method of claim 1, further comprising:

based on the second determination and through a second parallel thread:

identifying a first block allocation table (BAT) specified in the first replica virtual machine disk;

obtaining, using the first BAT, a first data block offset corresponding to the first data block number;

obtaining, from the first replica virtual machine disk and through the symbolic link, a first data block stored at the first data block offset; and storing, in the disk cache, the first BND and the first data block.

3. The method of claim 2, further comprising:

obtaining, from the disk cache, a second data block that was previously stored in the disk cache;

allocating a new data block in a granular differencing disk (GDD);

writing the second data block to the new data block;

identifying a new data block offset of the new data block; and updating, to include the new data block offset, a second BAT specified in the GDD.

4. The method of claim 1, further comprising:

prior to receiving the first read request:

receiving a restore request comprising a virtual machine identifier (ID) pertaining to a virtual machine;

identifying a disk universal resource locator (URL) associated with the virtual machine ID;

establishing, using the disk URL, the symbolic link to the first replica virtual machine disk;

creating a granular differencing disk (GDD) from the first replica virtual machine disk; and creating the GVM using the GDD.

5. The method of claim 1, further comprising:

receiving, from the GVM, a second read request comprising a second filename;

mapping the second filename to a second sector number;

deriving a second data block number using the second sector number;

hashing the second data block number to obtain a second BND;

performing a third lookup on the disk cache using the second BND;

making a third determination, based on the second lookup, that the disk cache comprises the second BND;

based on the second determination:

identifying a data block in the disk cache, wherein the data block is associated with the second BND;

obtaining, from the disk cache, a data section of the data block; and providing, in response to the second read request, the data section to the GVM.

6. A system, comprising:

a first replica virtual machine disk;

a disk cache;

a granular virtual machine (GVM) executing on a first computer processor; and a first virtual machine backup intelligence (VMBI) executing on the first computer processor and operatively connected to the GVM, the disk cache, and the first replica virtual machine disk, wherein the first VMBI is programmed to:

receive, from the GVM, a first read request comprising a first filename;

map the first filename to a first sector number;

derive a first data block number using the first sector number;

perform a first lookup on a block allocation table (BAT) specified in a granular differencing disk (GDD) using the first data block number;

make a first determination, based on the first lookup, that the BAT lacks the first data block number;

hash, based on the first determination, the first data block number to obtain a first block number digest (BND);

perform a second lookup on the disk cache using the first BND;

make a second determination, based on the second lookup, that the disk cache lacks the first BND;

based on the second determination and through a first parallel thread:

obtain, from the first replica virtual machine disk and through a symbolic link, first sector data stored at a first disk sector associated with the first sector number; and provide, in response to the first read request, the first sector data to the GVM.

7. The system of claim 6, further comprising:

a plurality of virtual machines executing on the first computer processor; and a virtual machine hypervisor (VMH) executing on the first computer processor and operatively connected to and responsible for managing the plurality of virtual machines and the GVM, wherein the VMH is further operatively connected to the first VMBI.

8. The system of claim 7, further comprising:

the granular differencing disk (GDD) operatively connected to the VMH and the first VMBI, wherein the GDD is a local mounting point for the first replica virtual machine disk.

9. The system of claim 8, further comprising:

a first physical storage array comprising a plurality of virtual machine disk sets, the GDD, and the disk cache.

10. The system of claim 9, further comprising:

a local computing system (LCS) comprising the first computer processor, the plurality of virtual machines, the GVM, the VMH, the first VMBI, and the first physical storage array.

11. The system of claim 10, further comprising:

a second VMBI operatively connected to the LCS; and a plurality of replica virtual machine disk sets operatively connected to the second VMBI and comprising a first replica virtual machine disk set, wherein the first replica virtual machine disk set comprises the first replica virtual machine disk.

12. The system of claim 11, further comprising:

a second physical storage array comprising the plurality of replica virtual machine disk sets.

13. The system of claim 12, further comprising:
a remote storage system (RSS) comprising the second VMBI and the second physical storage array.

14. A non-transitory computer readable medium (CRM) comprising computer readable program code, which when executed by a computer processor, enables the computer processor to:
receive, from a granular virtual machine (GVM), a first read request comprising a first filename;
map the first filename to a first sector number;
derive a first data block number from the first sector number;
perform a first lookup on a block allocation table (BAT) specified in a granular differencing disk (GDD) using the first data block number;
make a first determination, based on the first lookup, that the BAT lacks the first data block number;
hash, based on the first determination, the first data block number to obtain a first block number digest (BND);
perform a second lookup on a disk cache using the first BND;
make a second determination, based on the second lookup, that the disk cache lacks the first BND;
based on the second determination and through a first parallel thread:
obtain, from a first replica virtual machine disk and through a symbolic link, first sector data stored at a first disk sector associated with the first sector number; and
provide, in response to the first read request, the first sector data to the GVM.

15. The non-transitory CRM of claim 14, further comprising computer readable program code, which when executed by the computer processor, enables the computer processor to:
based on the second determination and through a second parallel thread:
identify a first block allocation table (BAT) specified in the first replica virtual machine disk;
obtain, using the first BAT, a first data block offset corresponding to the first data block number;
obtain, from the first replica virtual machine disk and through the symbolic link, a first data block stored at the first data block offset; and
store, in the disk cache, the first BND and the first data block.

16. The non-transitory CRM of claim 15, further comprising computer readable program code, which when executed by the computer processor, enables the computer processor to:
obtain, from the disk cache, a second data block that was previously stored in the disk cache;
allocate a new data block in the granular differencing disk (GDD);
write the second data block to the new data block;
identify a new data block offset of the new data block; and
update, to include the new data block offset, a second BAT specified in the GDD.

17. The non-transitory CRM of claim 14, further comprising computer readable program code, which when executed by the computer processor, enables the computer processor to:
prior to receiving the first read request:
receive a restore request comprising a virtual machine identifier (ID) pertaining to a virtual machine;
identify a disk universal resource locator (URL) associated with the virtual machine ID;
establish, using the disk URL, the symbolic link to the first replica virtual machine disk;
create the granular differencing disk (GDD) from the first replica virtual machine disk; and
create the GVM using the GDD.

18. The non-transitory CRM of claim 14, further comprising computer readable program code, which when executed by the computer processor, enables the computer processor to:
receive, from the GVM, a second read request comprising a second filename;
map the second filename to a second sector number;
derive a second data block number using the second sector number;
hash the second data block number to obtain a second BND;
perform a third lookup on the disk cache using the second BND;
make a third determination, based on the second lookup, that the disk cache comprises the second BND;
based on the second determination:
identify a data block in the disk cache, wherein the data block is associated with the second BND;
obtain, from the disk cache, a data section of the data block; and
provide, in response to the second read request, the data section to the GVM.

* * * * *